United States Patent [19]
Yagi et al.

[11] 4,198,142
[45] Apr. 15, 1980

[54] POWER SUPPLY RESETTING CIRCUIT FOR CAMERA

[75] Inventors: Michio Yagi, Hachioji; Kazuo Shiozawa, Hino; Kijiro Suzuki, Tokyo; Kazuhisa Aratame, Hachioji; Haruji Ishihara, Kodaira; Ryushi Shimokawa, Fuchu, all of Japan

[73] Assignees: Konishiroku Photo Industry Co., Ltd.; Hitachi, Ltd., both of Japan

[21] Appl. No.: 924,756

[22] Filed: Jul. 14, 1978

[30] Foreign Application Priority Data

Jul. 18, 1977 [JP] Japan .................................. 52/85075

[51] Int. Cl.² .......................... G03B 7/08; G03B 17/38
[52] U.S. Cl. ................................... 354/60 R; 354/266
[58] Field of Search ................... 354/60 R, 267, 266, 354/202

[56] References Cited
U.S. PATENT DOCUMENTS

| | | | |
|---|---|---|---|
| 3,693,524 | 9/1972 | Furuta | 354/60 R X |
| 4,003,063 | 1/1977 | Takahashi et al. | 354/60 R X |
| 4,114,173 | 9/1978 | Tezuka et al. | 354/60 L X |

FOREIGN PATENT DOCUMENTS 2351192 5/1974 Fed. Rep. of Germany.
2309108 7/1974 Fed. Rep. of Germany.
2550112 5/1976 Fed. Rep. of Germany.

Primary Examiner—Michael L. Gellner
Attorney, Agent, or Firm—Craig and Antonelli

[57] ABSTRACT

The power supply resetting circuit of the invention is adapted to be used in such a type of camera that the shutter release action comprises two steps of strokes: a first stroke by which a power supply circuit for electric circuits mounted in the camera, such as a light measuring circuit, is closed, and a second stroke by which at least the operation of the circuits mounted in the camera is started. The power supply resetting circuit has a self-holding circuit for closing the power supply circuit and additionally mounted to the electric circuits in the camera. The self-holding circuit is adapted to be turned into operation by the second stroke of the shutter release action, substantially simultaneously with the starting of operation of the circuits mounted in the camera, and to be turned inoperative, so as to break the power supply circuit, at the instant at which the photographing sequence is completed or with a certain time lag to that instant.

3 Claims, 7 Drawing Figures

POWER SUPPLY RESETTING CIRCUIT FOR CAMERA

BACKGROUND OF THE INVENTION

The present invention relates to a power source resetting circuit adapted for use in such a type of camera that the power source circuit in the camera is closed by a first stroke of the shutter release action and at least the operation of electric circuits in the camera are started by a second stroke of the shutter release.

In conventional cameras, the closed state of the power supply switch, which has been caused by the second stroke of the shutter release action, is mechanically held by the action of the second stroke, and is dismissed by the running action of the shutter screen, or by the closing action of the shutter vane, so as to reset the power supply switch.

The above stated operation is usually performed by a sole or two switches. In case that only one switch is used, it is necessary to make the switch closing member holds the switch in closed state by a combined action of camera-starting mechanical action and the mechanical action derived from the running of the shutter screen. Referring now to the system incorporating two switches, it is necessary to produce a signal for holding the power supply switch by such an electric composition that each switch is closed by one of the above mentioned two mechanical actions.

These conventional systems inconveniently poses various problems such as increased number of parts, necessity of timing adjustment and uncertainty of operations of respective parts. Further, there is an increasing demand for a suitable measure to avoid the eyesore increment of number of switches in modern electronic cameras.

SUMMARY OF THE INVENTION

It is therefore a major object of the invention to provide a novel method of resetting the power supply circuit for cameras.

The above stated object is fairly fulfilled by a power supply resetting circuit basically having the following features. The resetting circuit of the invention is adapted for use in such a camera that the electric power supply circuit for the electric circuits in the camera is closed in the first stroke of the shutter release, and at least the operations of the electric circuits are caused in the second stroke of the shutter release. The power supply resetting circuit has a self-holding circuit for closing the power supply circuit, provided in the circuits in the camera. The self-holding circuit is turned into operation by the second stroke of the shutter release, substantially at the same instant at which the electric circuits in the camera are turned into operation, and turned into inoperative state to forcibly open the power supply circuit after the completion of the photographing sequence with or without delay.

DESCRIPTION OF THE PREFERRED EMBODIMENTS

Figure 1:
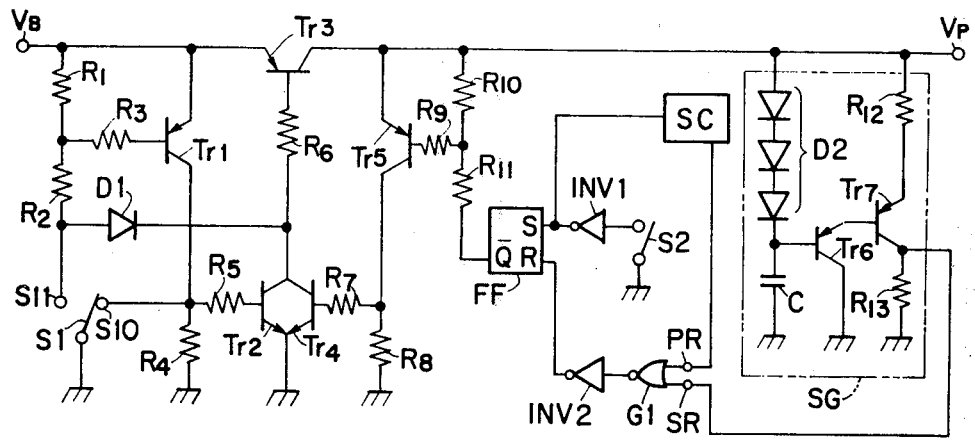
FIG. 1 is a circuit diagram of a power-supply resetting circuit for camera of a first embodiment of the invention.

Referring first to FIG. 1, a basic power supply and a power supply for, for example, a light measuring circuit are designated at $V_B$ and $V_P$, respectively. A power supply and light measuring switch S1 is adapted to be held in contact with the right-hand side contact S10 when the shutter is not released, but is brought into contact with the left-hand side contact S11 as the first stroke of the shutter release is made. A first to seventh transistors Tr1 to Tr7, as well as a first to thirteenth resistors R1 to R13 are connected in the illustrated manner. A first diode D1 is connected between the left-hand side contact S11 of the power supply switch S1 and the base of the third transistor Tr3 (collectors of the second and fourth transistors Tr2 and Tr4). This first diode D1 constitutes a part of a self-holding circuit for preventing the chattering from being caused by a vibration of the power supply switch S1.

An RS flip-flop circuit FF has an output terminal Q which is connected through a resistor to the base of the fifth transistor Tr5 and to the aforementioned power supply Vp for the light measuring circuit.

A release switch S2 is adapted to be closed in the step of the second stroke of the shutter release operation, and is adapted, when closed, to put a solenoid release (not shown) for starting a series of photographing sequence. This release switch S2 is connected to the S input terminal of the RS flip-flop circuit, via a first inverter INV1. This release switch is operatively and mechanically connected to the power supply switch S1, such that the power supply switch S1 is kept closed as long as the release switch S2 is kept closed.

A NOR gate G1 is connected to the R input terminal of the RS flip-flop circuit FF through a second inverter INV2. A reference symbol SR denotes a start reset signal which is formed with a pulse having a constant duration generated substantially at the same instant as the operation of the power supply switch S1 in the first stroke of the shutter release operation. This start reset signal is generated by a later-mentioned start reset signal generating circuit (SG) as enclosed by two-dots-and-dash line in FIG. 1.

Figure 2:
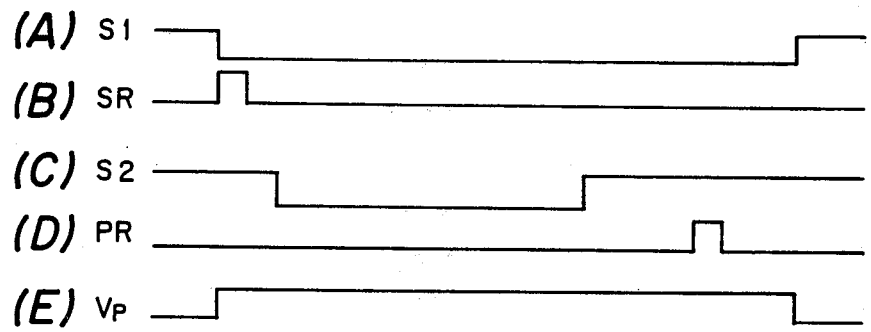
FIGS. 2A to 2E show wave forms of electric signals available at respective parts of the circuit as shown in FIG. 1.

As will be seen from the time chart of FIG. 2, the duration of the start reset signal SR is selected to be extremely short as compared with the duration of the second stroke of the shutter releasing action. The start reset signal generating circuit is constituted, as illustrated, by two transistors Tr6 and Tr7, a pulse-forming capacitor C and two resistors R12 and R13. A symbol D2 designates a second diode. These elements of the circuit are all integrated as an IC.

A symbol SC denotes a control circuit for controlling the sequential operation of the shutter. This control circuit SC is connected to one of the input terminals of the NOR gate G1, and to the S input terminal of the RS flip-flop circuit FF. The control circuit SC is constituted by suitable gate means and memory means which in combination are adapted not to deliver a later-mentioned PR pulse when the release switch S2 is closed to apply a high level signal to the aforementioned input terminal S.

The PR pulse is an electric pulse which is produced at the time of completion of the photographing sequence or, alternatively, with a certain time lag behind the completion of the sequence. Thus, the PR pulse may be produced by the shutter operation controlling circuit SC. The PR pulse is not produced, as stated before, when the release switch S2 is kept closed.

In operation, as the shutter release operation is made, the power supply and light-measuring switch S1 clears the right-hand side contact S10 and brought into contact with the left-hand side contact S11, in the step of the first stroke of the shutter release operation. Consequently, the first transistor Tr1 is caused to conduct, as well as the second and third transistors Tr2 and Tr3. As a result, the voltage of the basic power supply $V_B$ is applied to the power supply $V_P$ for the light measuring circuit, so that the light measuring circuit (not shown) is turned into operation. At the same time, a start reset signal SR is generated by the start reset signal generating circuit SG and is delivered to the NOR gate G1. However, since the release switch S2 has not been closed yet at this time, the output terminal $\overline{Q}$ of the RS flip-flop circuit FF carries a high level signal, so as to keep the fifth transistor Tr5 not conducting.

Therefore, if the shutter release operation is cancelled at this stage, i.e. if the power supply switch S1 is turned back into contact with the right-hand side contact S10, the power supply to the light measuring circuit from the basic power supply $V_B$ is ceased to allow the circuit bring back to the initial state.

Then, as the release switch S2 is closed in the step of the second stroke of the shutter release operation, the S input terminal of the RS flip-flop circuit, whose R input terminal has been turned to carry the low level signal, comes to carry the high level signal. Consequently, the state of the output terminal $\overline{Q}$ of the RS flip-flop circuit FF is turned to low level, thereby to make the fifth transistor Tr5 conductive. As a result, a current is caused to flow through the base of the fourth transistor Tr4, thereby to turn the latter into conductive state. Therefore, according to the conductive state of the fourth transistor Tr4 the third transistor Tr3 holds its conductive state until the state of the output terminal $\overline{Q}$ of the RS flip-flop circuit FF is turned to low high level.

Then, the photographing sequential operation such as, in case of a single-lens reflex camera, ascending of the mirror, aperture adjustment and shutter release, is performed. This sequential operation is completed with the ending of the running of the shutter screen.

Provided that the shutter release operation has been finished by the time of the completion of the photographing sequential operation, the electric pulse PR of a certain pulse width, produced by the shutter operation controlling circuit SC, is delivered into the NOR gate G1, precisely at the time of completion of the photographing sequential operation or, alternatively, with a certain time lag. As the PR pulse is delivered to the NOR gate G1, the state of the R input terminal of the RS flip-flop circuit FF is turned to high level, so that the state of the output terminal $\overline{Q}$ is turned to high level, thereby to cause turn the fifth transistor Tr5 into nonconductive state, as will be seen from the time chart of FIG. 2.

Consequently, the release switch S1 leaves the left-hand side contact S11 and comes into contact with the right-hand side contact S10, so that the transistor Tr3, which has been held by itself, is made not conductive. The power supply from the basic power supply $V_B$ to the light measuring circuit is therefore stopped.

The operations of respective circuits are performed by signals obtained from clock pulses, excepting the manual triggering of the shutter release. It is possible to install these circuits even in an inherently small-sized camera, if these circuits are formed as ICs.

If the release switch S2 is still kept closed after the completion of the running of the shutter screen, the situation is same as that of a continuous photograph taking, and the shutter operation controlling circuit SC does never produce the electric pulse PR. The third transistor Tr3 therefore continues to hold itself, so as to keep the supply of the voltage of the basic power supply $V_B$ to the light measuring circuit.

Provided that the shutter releasing action is held in its first stroke, at the time of completion of the screen running, the power supply switch S1 functions to allow the application of the voltage of the basic power supply $V_B$ to the light-measuring circuit. Needless to say, in both of the above stated conditions, the electric pulse PR is input to the NOR gate, so as to turn the third transistor Tr3 non-conductive, as soon as the shutter release operation is completely finished.

Figure 3:
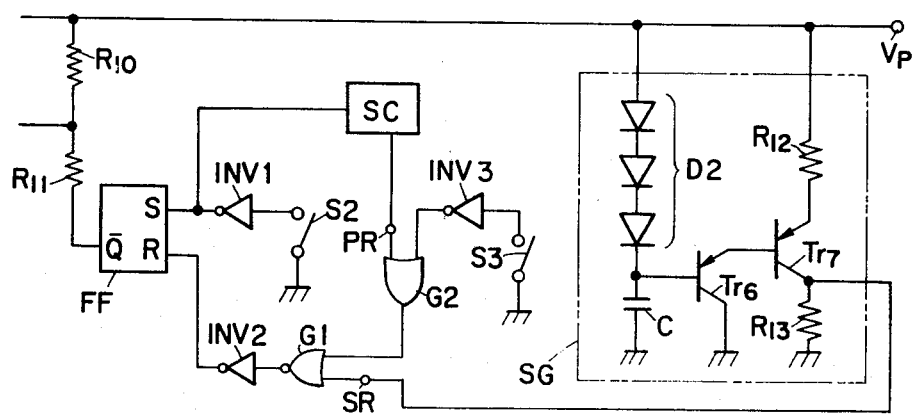
FIG. 3 is a circuit diagram of an essential part of a power-supply resetting circuit for camera of a second embodiment of the invention.

Referring now to FIG. 3 showing a second embodiment of the invention, an OR gate G2 is connected between the aforementioned shutter operation controlling circuit SC and one of the input terminals of the NOR gate G1.

It is assumed here that, in this embodiment, the signal PR is produced by the shutter operation controlling circuit SC with a predetermined time lag, behind the time of completion of the photographing sequence.

A film winding switch S3 is adapted to be closed in relation to the film winding action. The opening period of this switch is considerably short. Since this switch is intended for inputting a signal of short duration to the OR gate G2, this may be substituted by a pulse signal which is issued by suitable means at the time of commencement of completion of the winding action. A symbol INV3 designates a third inverter connected between the switch S3 and the other input terminal of the OR gate G2.

According to this arrangement, the output terminal of the OR gate G2 assumes a state of low level, when the high level signals from the shutter operation controlling circuit SC and the third inverter INV3 are not delivered to respective input terminals of the OR gate G2. However, as either one or both of above stated high level signals are delivered to respective input terminals of the OR gate G2, the output from the OR gate G2 is always maintained at the high level, so that the high level signal is directly input to one of the input terminal of the NOR gate G1.

Consequently, the self-holding circuit, which has been operated in the same manner as the foregoing embodiment, is turned into inoperative state, by the earlier one of the PR signal from the shutter operation controlling circuit SC and the closing signal of the film winding switch S3.

The first embodiment can be modified as follows.

Namely, the arrangement may be such that the signal from the shutter operation controlling circuit is produced at an instant at which the electric operation of the photographing sequence is completed, e.g. at an instant at which the electromagnetic means for retaining the shutter screen is turned inoperative. Thus, the above mentioned signal is generated while the mechanical action caused by the final electric control operation, e.g. the running of the shutter screen, is still continued or at the instant at which the mechanical action is completed. This signal obtained from the electric operation also can be used as the signal for turning the self-holding circuit inoperative.

Hereinafter, several other modifications will be described by way of example.

(1) The electric pulse PR for resetting the flip-flop circuit FF can be produced by a delaying means constituted by a circuit means adapted to detect the state of the photographing sequence operation and the state of the release switch S2 in relation with each other, and a counter circuit to which the output derived from the circuit mean is delivered. The delaying time of this delaying means can be selected and set longer than the time of the instant of completion of the photographing sequence, e.g. an instant immediately after the completion of the film winding action by the automatic film winding mechanism, which is started on the basis of the completion of the start of the shutter screen.

(2) The starting of operation of the self-holding circuit may be delayed behind the starting of the circuit in the camera, if the delaying time is within the time length required for the shutter release member to return to its starting position after the latter is released from finger.

(3) The circuit as referred to as "circuit in the camera" may be other circuit than the described light-measuring circuit, such as electromagnetic aperture control circuit, electronic shutter control circuit or a circuit means adapted to operate these circuits simultaneously or in sequence.

(4) The switches for the electric circuits, especially the switch for the light-measuring circuit, may be provided independently of the power supply switch which is operated in the step of the first stroke of the shutter releasing action.

(5) It is possible to provide other switches or switch, e.g. a safety switch related to the rotation of the film winding lever, may be connected in series to the power supply switch which is operated in the step of the first stroke of the shutter releasing action.

From the foregoing description, it will be seen that a highly reliable power supply resetting circuit having a simple construction is provided by the present invention.

We claim:

1. A power supply resetting circuit for use in such a camera that the shutter release action has two steps of strokes: a first stroke by which an electric power supply circuit is closed to supply the electric power to circuits mounted in the camera such as a light-measuring circuit, and a second stroke by which at least the photographing operation of said circuits is started, said power supply resetting circuit comprising a self-holding circuit and a start reset signal generating circuit provided in addition to said circuits mounted in the camera and adapted for closing and breaking said power supply circuit, wherein the arrangement is such that said start reset signal generating circuit generates a start reset signal for setting said self-holding circuit inoperative according to said first stroke of the shutter release action, and that said self-holding circuit is turned operative so as to hold closed said electric power supply circuit by said second stroke of the shutter release action substantially simultaneously with the starting of operation of said electric circuits mounted in the camera, and that said self-holding circuit is turned inoperative, so as to break said power supply circuit, at the instant at which the photographing sequence is completed or within a predetermined time lag behind that instant.

2. A power supply resetting circuit for use in such a camera that the shutter release action has two steps of strokes: a first stroke by which an electric power supply circuit is closed to supply the electric power to circuits mounted in said camera such as a light-measuring circuit, and a second stroke by which at least the photographing operation of said circuits mounted in said camera is started, said power supply resetting circuit comprising a self-holding circuit and a start reset signal generating circuit provided additionally to said circuits in the camera and adapted for closing and breaking said power supply circuit, wherein the arrangement is such that said start reset signal generating circuit generates a start reset signal for setting said self-holding circuit inoperative according to said first stroke of the shutter release action, and that said self-holding circuit is turned operative so as to hold closed said electric power supply circuit by said second stroke of shutter release action, substantially simultaneously with the starting of said circuits in the camera, and that said self-holding circuit is turned inoperative, so as to break said power supply circuit, by the earlier one of a signal generated at an instant lagged by a predetermined time behind the instant of completion of photographing sequence and a signal generated in relation with the subsequent winding of the film.

3. A power supply resetting circuit for use in such a camera that the shutter release action has two steps of strokes: a first stroke by which an electric power supply circuit is closed to supply an electric power to circuits mounted in the camera such as a light-measuring circuit, and a second stroke by which at least the photographing operation of said circuits mounted in the camera is started, said power supply resetting circuit is characterized by comprising a self-holding circuit and a start reset signal generating circuit provided additionally to said circuits in the camera and adapted for closing and breaking said power supply circuits, wherein the arrangement is such that said start reset signal generating circuit generates a start reset signal for setting said self-holding circuit inoperative according to said first stroke of the shutter release action, and that said self-holding circuit is turned operative so as to hold closed said electric power supply circuit by said second stroke of shutter release action, substantially simultaneously with the start of said circuits in the camera, and that said self-holding circuit is turned inoperative so as to break said power supply circuit, by a pulse signal which is generated at an instant at which the mechanical action caused by the final electric operation in said photographing sequence is still continued or just ended.

* * * * *